United States Patent Office 2,987,853
Patented June 13, 1961

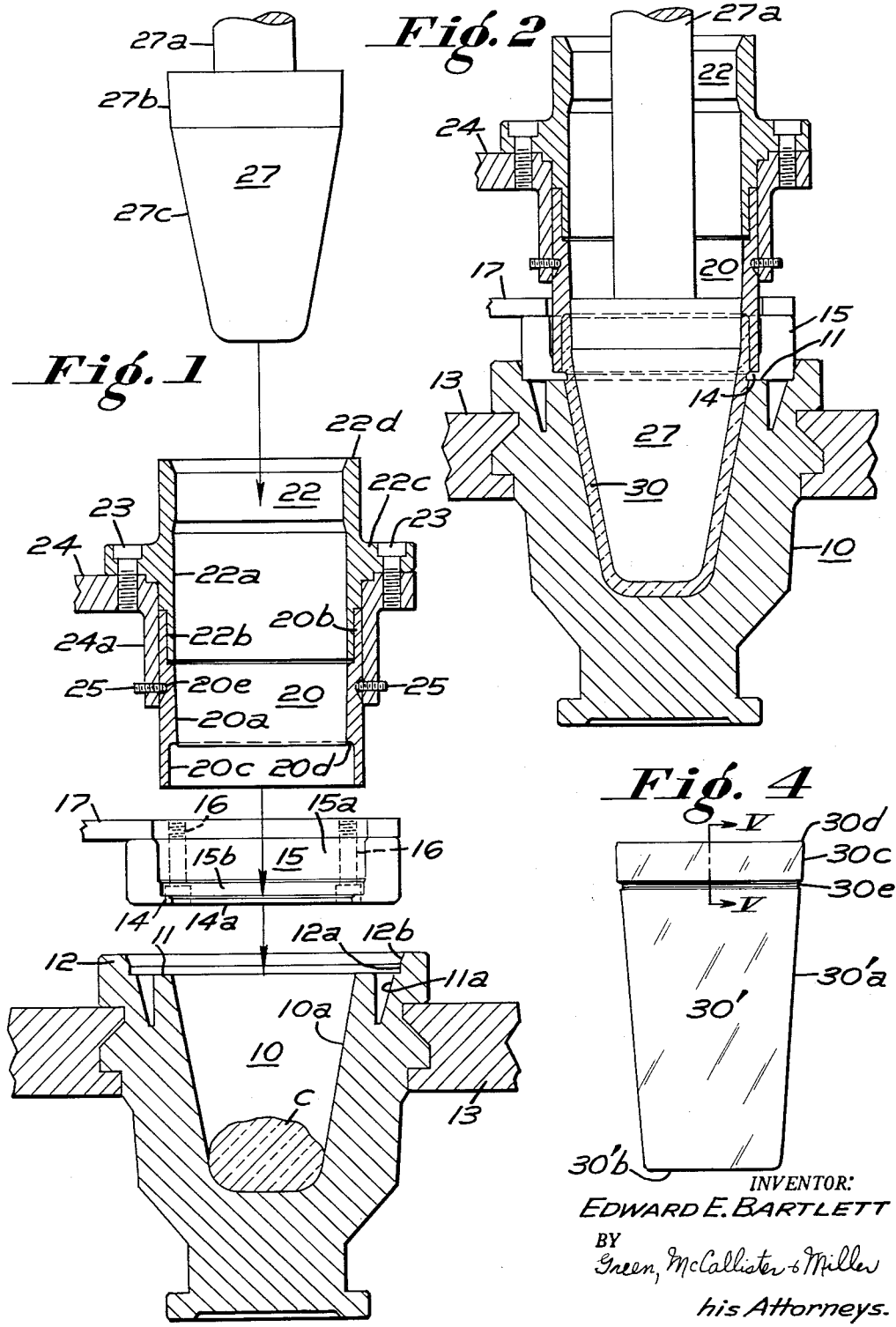

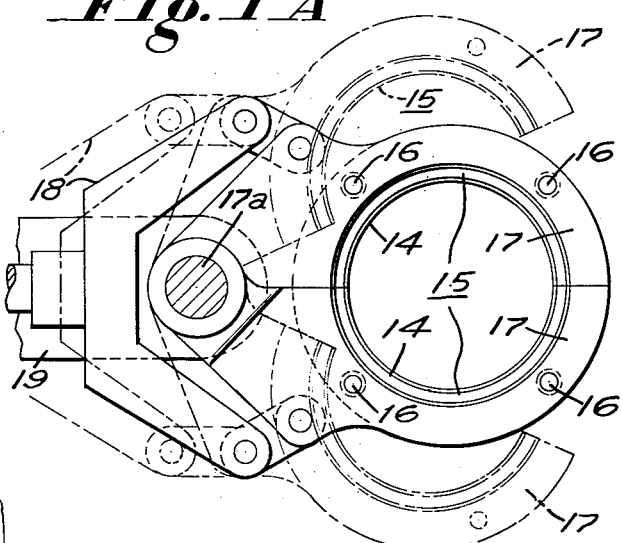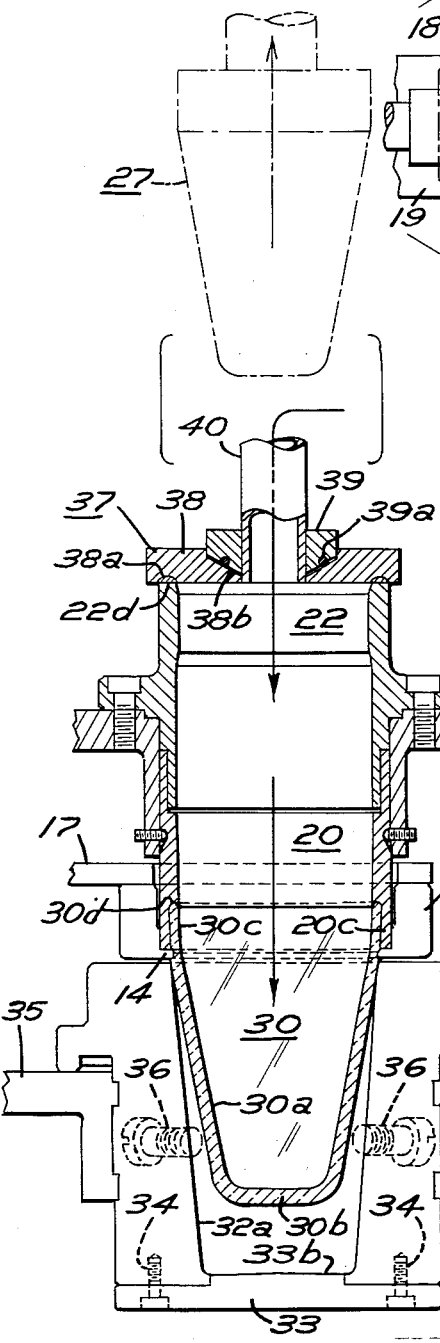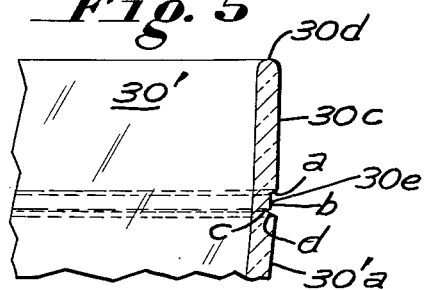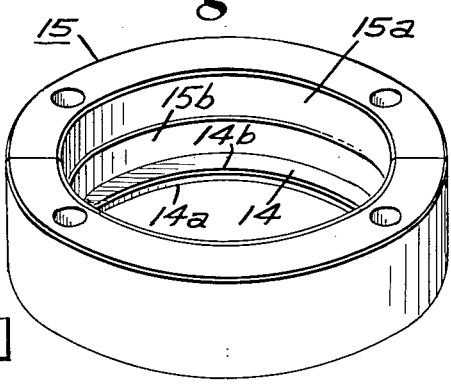
INVENTOR:
EDWARD E. BARTLETT
BY
Green, McCallister & Miller
his Attorneys.

2,987,853
APPARATUS FOR FORMING PACKERS WARE
Edward E. Bartlett, 4387 Boca Chica Blvd.,
Brownsville, Tex.
Filed July 15, 1955, Ser. No. 522,328
2 Claims. (Cl. 49—72)

This invention pertains to the manufacture of articles such as glassware from vitreous, plastic and similar materials that may be formed while in a hot, plastic or semi-plastic state and particularly, to apparatus and procedure for making packers ware such as tumblers.

Packers ware has been used as sales containers for cheese, spreads, etc., and as such, there is a need for an effective seal between the containers and their lids as well as a need for containers of attractive shape and design. In the first instance, it is highly important to effectively seal-off food or other spoilable contents of the ware to preserve and protect them from the atmosphere. Even after a packers item has been purchased, good resealing is required by the housewife as she uses portions of the contents.

In the second instance, the present day trend has been to make the ware as attractive as possible, so that the empty container may then be used for ornamental purposes or for more practical purposes such as a drinking glass, etc. In both instances, vertical or longitudinal seams in the article are undesirable and particularly so when, because of their extent or location, they detract from the appearance of the ware or are such that difficulty is encountered in providing a good seal.

Articles of ware that have been used as packers ware and produced by conventional press and blow methods, have heretofore had vertical or longitudinal seams in their finish and along their banding and lip edge (sealing) portions. In this connection, it has been customary to use a partible plunger or neck ring part and thus, limit seams to the upper end portion of the article; seams may be excluded from its main body or major side and base wall portions by using a one-piece blank mold. However, this produces vertical seams along the sides of the sealing rim or banding portion as well as along the immediate lip edge (along the sealing surfaces) that I have set out to eliminate with my invention.

Essentially, the problem deals with the provision of a so-called sure or positive seal finish in and about the lip edge and adjacent banding or reinforcing portions of an article of ware. The solution to the problem has been complicated by the need for a relatively strong article throughout its extent and particularly, at its sealing surfaces and between its sealing surface and its main body or major side wall portions.

In a conventional press and blow type of operation, such as accomplished by employing a modern type of machine for this purpose, it has been customary to carry the parison by a partible plunger or neck mold which substantially encloses its lip, banding and edge portions. However, the use of such a type of mold made up of swingable mold sections or halves inherently produces vertical or longitudinal seams along the surfaces which are enclosed by the mold parts.

There have been variations in the handling of the parison from the standpoint of its plunger or neck mold. For example, in accordance with one method, the mold is opened after thea rticle has been pressed to cool, solidify or set the surfaces, so that the parison may be supported without damage during subsequent operations. In another method, the parison is dropped into a blow mold, possibly against an air cushion. All such methods require one or more reheating steps in forming a completed article and all produce surface seams at sealing surfaces.

All of the prior procedures, regardless of whether the neck mold is preliminarily removed or not, essentially employ a separate cooling or setting of the main body with respect to banding and neck portions of the article. In capping and closing-off packers ware and also in packing the contents, strength is needed in the article as to its shoulders and side walls to withstand vertical longitudinal pressures as well as hydrostatic pressures. To provide better strength, some plunger or neck molds employ a groove to provide a corresponding bead or thickened portion adjacent a neck of the article.

In accordance with my invention, I have solved the problem presented by making use of a banding upper mold part of one-piece or continuous wall construction to form an upper sealing surface or lip edge and banding portions. This mold is so shaped that the parison or completed article may be removed endwise or vertically therefrom without damaging the surfaces and without the need for partible halves or sections. I make use of a blank or press mold which is of one-piece construction and from which the parison may be raised or lifted out after it has been preliminarily formed into a blank or parison. In addition, I provide an intermediate, partible so-called ring mold of novel construction and utilization wherein it essentially has a radially-inwardly projecting annulus ring that is adapted to form or provide a corresponding annular depression, recess or groove in the wall of the parison and which results in a lesser thickness of the parison wall at the particular localized area involved.

The operation is conducted in such a manner that reheating of the blank or parison is not necessary, the shape, parison or blank is cooperatively supported, suspended or depended from an assembly of the banding and ring molds, from the time the upper portions of the blank are initially and completely formed by the first forming operation, and until the article is completed by forming side wall and bottom (main body) portions of the blank or parison, as in a blow mold.

The apparatus of my invention may be employed with an integral one-piece or a partible swing type of blow mold construction, since it is contemplated that the parison will be rotated therein during the blowing operation. This will thus eliminate any seams along main body and bottom portions of the completed article.

Although my procedure produces an article that, from the standpoint of those skilled in the art, might appear to lack necessary strength for utilization as a packing item, because of its inwardly-offset groove or depressed, substantially wire-edge portion, I have found that it actually has superior strength by reason of the way in which its portions are chilled or cooled-set. That is, I initially eliminate localized stresses and strains by first cool-setting a narrow intermediate portion of the shape between a relatively hot, upper banding portion and a relatively hot, lower wall or side portion, in such a manner that there is a blending-off action of heat transfer into the upper and lower portions. This contributes to dimensional stability in the article.

An exceptionally strong finished article is provided and its stress-strain pattern is substantially uniform throughout its full wall extent. It is accomplished by employing an intermediately located, indented, partible-ring, supporting portion of minimized width that lies immediately adjacent the lower portion of the preliminary shape, blank or parison that is to be after-formed or finished and that also lies immediately adjacent to the upper banding portion of the shape. This ring portion or mold has an essentially narrow projecting contact and produces a somewhat wire edge type of band or depression, so that there is also a blending-in action of heat transfer when the upper banding and the lower wall or side and bottom portions of the finished article are being cooled.

It has thus been an object of my invention to substantially eliminate seams or ribs on banding and lip or sealing surfaces of articles, such as packers ware, and particularly as applied to a press and blow type of manufacture;

Another object has been to devise a new approach to the problem of releasably supporting a preliminary shape or parison as well as a completed article;

A further object of my invention has been to devise new and improved apparatus for manufacturing articles such as packers ware as well as an improved method of making ware;

These and many other objects of my invention will appear to those skilled in the art from the drawings and the specification.

In the drawings, FIGURE 1 is a vertical view in elevation and partial section showing apparatus for accomplishing a preliminary or parison-forming operation of my invention and showing parts of the apparatus in an aligned, but separated relationship;

FIGURE 1A is a top plan view on the scale of FIGURE 1 showing details of the construction and mounting of an intermediate or ring mold part of the apparatus of FIGURE 1;

FIGURE 2 is a view similar to FIGURE 1, but showing parts of the apparatus in a cooperating blank or parison-forming relationship and showing the forming of a parison in accordance with my invention;

FIGURE 3 is a vertical view in elevation and partial section showing a final step of my operation wherein the preliminary shape, blank or parison is finally formed to provide a completed article; in this figure, a blow head is shown applied to an upper or plunger mold assembly that is holding the parison or preliminary shape, while it is being formed as by blowing into a final shape;

FIGURE 4 is an enlarged view in vertical elevation showing an article of ware as constructed in accordance with the apparatus and procedure of my invention;

FIGURE 5 is a greatly enlarged fragmental section taken along the line V—V of FIGURE 4;

Figure 6 is an enlarged perspective view in elevation showing details of the construction of a partible ring mold disclosed in FIGURES 1 to 3, inclusive.

Summarized briefly, in carrying out my invention I utilize an integral or one-piece-blank-enclosing wall type of upper banding mold as an upper or plunger mold assembly with an intermediate, partible, separable or segmental ring mold, and may utilize an integral or one-piece blank or press mold and an integral or partible final or blow mold.

An initial blank shape or parison is completely formed as to its upper banding and intermediate ring portions from a gob or charge of the material, while its major side and bottom or body wall portions are preliminarily shaped within a parison or blank mold, as by the stroke of a pressing plunger. Then, the parison or blank mold drops or moves away, leaving the parison or preliminary shape suspended in or carried by the upper mold assembly whose banding and ring parts are maintained in a cooperating relationship which is the same as employed during the preliminary or pressing operation. During this time, the plunger retracts out of the mold assembly.

Next, a finish or blow mold moves into position or closes about the preliminary shape or parison while it is thus suspended. A blow head may be applied to the supporting assembly. The side wall and bottom walls or main body portions of the parison are then completely formed within the finish or blow mold. At this time, the completed shape or article may be moved or lifted out of the open mouth of the finish mold, with or without the application of suction to the blow head. If the article does not require supporting suction, the blow head may be removed before the shape has been moved out of the finish mold.

As the next step in the operation and before the article has cooled, it may be moved or lowered out of its position within the upper or banding mold, while it is still suspended or supported by the ring mold or the ring mold may be first opened to drop the article out of the banding mold means 20—22. In the first case, the article may be then placed on a suitable support and swing sections or portions of the ring mold then swung outwardly to release and discharge it. The only seams are those produced by the partible or segmental portions of ring mold 15 and essentially, by only a narrow annular ledge portion 14 or radially-inwardly projecting rim edge or partible ring (approaching a wire edge) of the ring mold which has a slight inward projection with respect to the bore or inner diameter of the banding mold means. It is thus apparent that the upper rim or lip edge and the banding wall portion which may have a relatively wide extent, and the major side or body and bottom wall portions of the completed article may be provided with a smooth finish from which longitudinal or vertical seams have been totally eliminated.

The substantially wire edge portion of the partible ring mold is employed in such a manner as to effectively support and suspend the parison throughout the forming operations in cooperation with the upper or banding mold means and while the parison or blank is being finish-formed, as by rotating it within the blow mold during the blowing operation. This action is such that a narrow intermediate ring portion of the shape is first cooled beyond a plastic condition or state before the upper and lower portions of relatively greater thickness and extent are set, so that undesirable attenuation or haphazard shaping are avoided. The seam area is an intermediate and substantially annular wire edge area which is of minimum visibility and extent and is provided in such a manner that no damage is done to the major body and banding portions of the article when one-piece or integral top and bottom molds are removed.

A good stress-strain pattern is obtained in the article and rejects or culls are substantially eliminated. It is highly important in the procedure to at least remove the bottom mold and thus, accomplish a preliminary solidification or wall-fixing of the shape at the seam area before the key supporting or suspending, partible ring mold is removed. Internal and surface wall damage are eliminated, and the only necessary appearance-detracting seams are located in an inwardly offset or depressed, narrow, substantially wire edge, annular area which is located intermediately of top banding and the main body portions of the article.

*The apparatus*

For the purpose of illustration and although a partible blank mold may be employed, in FIGURES 1 and 2, an integral or one-piece blank mold 10 is shown having an internal bore 10a which is closed at its lower end and that may diverge upwardly-outwardly along its extent to an open mouth portion for receiving a charge or gob of hot material C. At its upper or mouth end, the mold 10 has a ledge portion 11 and a rim portion 12 to, as shown in FIGURE 2, receive an intermediate, partible or segmental ring mold part 15.

As shown, the ledge portion 11 has a downwardly-offset or undercut annular groove 11a of substantially V-section, and the rim flange portion 12 has a substantially cylindrical inner bore 12a about the ledge portion 11 to surmount it. An outwardly-beveled mouth bore portion 12b is connected to the inner portion 12a to guidably receive partible or segment ring mold part 15. That is, the bore 12b passes the outer diameter of the ring mold part 15, so that the cylindrical periphery of the part may seat within the bore 12a and upon the ledge 11.

The V-shaped groove 11a provides the upper portion of the mold 10 with flexibility, so that no difficulty is encountered in inserting and removing the ring mold 15 and in obtaining a good seal between it and the seating ledge of the blank mold 10.

The partible ring mold 15 is of annular or cylindrical shape having arms, segment portions or halves, see FIGURES 1A and 6. An upper and large bore portion 15a (see also FIGURE 1) and a lower or intermediate and smaller bore portion 15b of the mold 15 are of cylindrical shape and have inner diameters and contours that substantially correspond to outer diameters and contours of a lower end wall or mouth portion 20c of a one-piece, integral or continuous wall type of lower plunger or banding mold part 20, so that it may slidably receive the latter mold 20, as illustrated in FIGURES 2 and 3 of the drawings. The lower mouth or end portion of the partible ring mold 15 has a radially-inwardly-projecting ledge, rim, ring or annulus portion 14 for supporting or suspending a parison 30. The ring portion 14 has a substantially cylindrical, narrow-edge, lower or outer bore portion 14a of reduced diameter and a beveled, inner bore portion 14b that connects with main bore 15b to by-pass a forming or press plunger 27 for movement into and out of the bore 10a of the parison or blank mold 10.

A series of peripherally spaced-apart bolt holes are provided along the wall of the two segments of mold part 15 to receive cap screws 16 (see FIGURES 1A and 6) which are threaded into or mounted on a pair of swing and vertically-movable support arms or members 17, see also FIGURE 1. The members 17 are shown pivoted at 17a for opening and closing movement on a bar 19, as effected by sliding movement of a collar and bifurcated lever actuating mechanism 18 on such bar.

As shown in FIGURE 1, the lower banding mold part 20 has a plunger-receiving, cylindrical central bore portion 20a and a ring mold-receiving larger internal bore portion 20b at its upper end to define a ledge and receive a lower end or mouth portion 22b of an upper banding and plunger-receiving mold part 22. The lower end or mouth portion of the lower mold 20 has a cylindrical lower end bore 20c which is also larger than the intermediate, main or central bore 20a and which defines a ledge therewith to form and maintain the shape of a mouth band portion 30c and lip portion 30d of the parison 30 which has been first-formed, as shown in FIGURE 2. It will be noted that the ledge portion 20d is rounded to provide a rounded lip edge 30d on the parison 30 when the material is moved or pressed upwardly from the gob C of FIGURE 1 into the preliminary or parison shape of FIGURE 2. As shown in FIGURES 3 and 4, the banding and lip edge portions 30c and 30d, respectively, of the completed article 30' are formed by the step of FIGURE 2.

The upper mold part 22 has a cylindrical bore 22a of the same diameter as the central bore 20a of the mold part 20 with which it is ordinarily assembled to, as shown in FIGURE 2, pass the presser or plunger 27. The outer diameter of the lower end potrion 22b of the wall of mold part 22 is offset inwardly to slidably or telescopically receive thereover the sleeve portion (along bore 20b) of the mold part 20.

A swing and vertically-movable arm 24 is secured in position to a flange portion 22c by inset cap bolts 23. It will be further noted that the arm member 24 has a downwardly-projecting sleeve portion 24a to cooperate with outer wall portions of the lower or banding mold part 20. Set screws 25 are adjustably carried by the sleeve portion 24a to engage within a groove portion 20e of the lower mold part 20 to aid in supporting the latter part from the arm member 24.

As shown in FIGURES 1 to 3, inclusive, the mold parts 20 and 22 are employed as a separable assembly, but one which has a continuous wall about or is not partible from the standpoint of or at areas of contact with the parison or blank that is being formed.

In FIGURE 3, I have shown a finish or blow mold 32 which may be partible about the parison or shape being formed; its lower end or bottom wall 33 is shown as removable. This mold may be a paste or iron mold with the former being preferred to provide a better, more smooth, and brighter finish. As disclosed, the bottom wall 33 of the blow mold is secured in position by set or cap screws 34. The mold 32 is carried by a swing arm or support member 35 and is secured in position with respect thereto by cap screws 36.

The blow mold 32 has an outwardly-diverging, smooth, cone-shaped wall bore 32a and a bottom end bore 33b of a desired contour for forming the major side wall portions, as well as the end or bottom wall portion of the article 30', see FIGURES 4 and 5. The finish mold 32 may, if desired, be of integral construction or have partible sections. I have illustrated a blow mold that will employ a layer of paste to present a smooth inner surface. The article is blown in a paste mold on a cushion of steam, in that heat is dissipated using water rather than air as in the case of an iron mold.

In FIGURE 3, a blow head 37 is shown provided with a positioning end plate or cap member 38 that has an annular groove on its lower face to receive a gasket ring 38a that seats upon an upper rim edge 22d of the upper mold part 22. A blow pipe 40 which may be connected to a suitable source of positive air pressure or alternately to such a source and to a vacuum, has a mounting boss 39 whose inner face is cone-shaped and carries an inset sealing gasket ring 39a. The ring 39a abuts against an outwardly-diverging, cone-shaped mounting ledge portion 38b of the end plate member 38 to seal-off the unit during its usage, e.g. during the blowing operation, and position the unit well above and out of contact with the parison 30 which is being blown.

As shown particularly in FIGURES 2 and 3, the ring or ledge portion 14 of the partible-wall ring mold 15 is the only portion which engages the parison or article at any time and which serves substantially as a wire edge portion or as a key supporting and suspending portion for the blank or parison and the finish-formed article.

In FIGURES 2 and 3, I have designated the preliminary or incompleted article or parison as 30 and in FIGURES 4 and 5, I have designated the completed article as 30'. As shown, the article 30' may have a slightly downwardly-converging or cone-shaped major side wall portion 30'a and a closing bottom or end wall portion 30'b. The banding portion 30c may be straight (in a vertical plane) and will preferably have a very slight downward divergence of, for example, one or two degrees from the vertical. The portion 30c may thus taper in an opposite direction to the major side wall portion 30'a. Among other things, this facilitates dropping a completed article out of the upper mold assembly. The portions which are completed by the final operation of FIGURE 3 have been given prime suffixes. The portions which have been previously finish-formed by the initial operation of FIGURE 2, are the banding portion 30c, the edge or lip portion 30d, and the intermediate, offset, ring or wire edge portion 30e.

As shown in FIGURE 5 of the drawings, the intermediate portion 30e comprises an inwardly-projecting ledge portion a which joins with or lies below and adjacent to the banding portion 30c, an inwardly-offset annular band or tongue portion b, an inwardly-projecting angle edge portion c, and a downwardly-sloped ledge portion d which lies above and joins with the main body or side wall portion 30'a.

In studying the shape of the portion 30e, as shown in FIGURE 5, in view of the shape of the portion 17 of the ring mold 15, it is apparent that after the finish or blow mold 32 has been removed, the upwardly-positioned plunger mold assembly 20—22 may be raised with respect to the article 30' to leave the article only suspended from the ring mold 15, after which the ring mold 15 may be parted and the completed article delivered. In making packers ware, I retain the article within the ring and plunger mold assembly 20—20 while removing the finish or blow mold 32 and then prefer to open the ring mold 15, so that the article drops out of the upper banding or plunger mold assembly 20—22. Employing either method, the upper and lower portions of the article are substantially simultaneously cooled and essentially, after the intermediate ring area has been set or cooled.

I have thus been able to produce packers ware in such a manner that unevenness is eliminated at sealing surface portions thereof by employing an intermediate partible and radially-offset, ring mold means with an upper banding mold means having smooth, continuous diametrical or wall surfaces without ribs or seams. I thereby provide a more positive and easier sealing and minimize the chance of food contamination through leakage at the seal. Essentially, I provide an intermediate suspension or segmental supporting ring 15 which is used in conjunction with the banding mold means and which projects inwardly towards and into the wall of the shape or article at an intermediate position and at a highly localized and narrow band or edge area with respect thereto.

Contrary to what may be thought, I have also eliminated any localized strain in the article, by reason of the narrow extent of the immediate, intermediately-positioned and partible supporting area, an associated enclosing of the larger, upper banding area while the blank or article is being handled, and by reason of the fact that the lower or major forming molds are removed with respect to the hot shape or article while it is being supported by the upper mold assembly, the major portion of which is of a one-piece, continuous or unbroken wall construction.

It is important to have the ring portion 14 lie immediately adjacent to the blank mold 10 and to provide a lesser thickness of the supporting portion 30e, so that when the blank or parison has been initially formed and the mold 10 removed, the intermediate portion 30e will be the first to cool and set and without distortion or elongation of the suspended major side wall and bottom portions of the shape or parison 30. The supported relationship of the shape is then such that its intermediate area, after having been finish-formed, is the first portion of the shape to be cooled and set, with the cooling action progressing towards the banding and sidewall areas, but not sufficiently to prevent the forming of a finished shape without the need for reheating the lower portion of the preliminary shape. Chips, breaks and the like have been eliminated in the finished article and with the elimination of localized strain or stress areas, promote better safety in filling operations and further minimize the possibility of food contamination.

During the last shaping operation, the parison 30, as well as the assembly of plunger, banding and ring mold parts may be relatively rotated by some suitable means with respect to the blow mold 32 and until the article 30' has been finished or formed. It will be noted that the retension of both the banding and ring mold portions in position after they have formed an upper portion of the shape, also protects such upper portion until the lower portion of the shape has also been finish-formed. I have been able to manufacture a packers tumbler without any vertical seams in its top finish ring or band and without vertical or other seams below its transfer or intermediate ring portion.

What I claim is:

1. Apparatus for forming a hollow relatively smooth wall article of packers ware such as a tumbler with a seamless sealing lip edge about its open end portion, a seamless side banding wall portion of full vertical extent, a seamless remaining side wall portion and a relatively narrow ring groove portion intermediate the side banding and remaining side wall portions from a material that is at least plastic in a heated condition which comprises, a presser for shaping a hot charge of the material into a hollow body having an open end portion, an upper mold means having a unitary banding mold part with an annular wall defining a continuous radially-outwardly-offset lip-edge-forming portion internally thereof and an adjacent vertically-downwardly-extending and open continuous radially-outwardly-offset banding-wall-forming portion for simultaneously finish-shaping a seamless lip edge and the full vertical extent of an adjacent seamless side banding wall portion about the open end portion of the hollow body, a partible ring mold positioned below said upper mold means and in its closed position having portions at an upper end thereof endwise-removably interfitting with said banding mold part to receive it therewithin, said partible ring mold having a relatively narrow partible ring projecting radially-inwardly along a lower edge of and beyond and of substantially lesser vertical extent than the offset banding-wall-forming portion of said banding mold part when said banding mold part is in an interfitting position therewithin for finish-forming a ring groove portion about the hollow body at a parting line spaced vertically from the lip edge and between the side banding wall portion and a remaining side wall portion of the hollow body, said partible ring having the only vertical joints which make contact with the hollow body and which form the only vertical seams on the hollow body, a parison mold of one-piece unitary wall construction to receive a hot charge of the material and having an open-end offset upper end portion, said partible ring mold having said partible ring at a lower end thereof which ring when closed endwise-removably interfits within the offset upper end portion of said parison mold, said partible ring being closely-positioned between the lower edge of the banding-wall-forming portion of said banding mold part and the offset end portion of said parison mold to project radially-inwardly therebeyond, said presser being constructed to move through said banding mold part and said partible ring into said parison mold for finish-shaping the seamless lip edge and the full extent of the seamless side banding wall portion and the ring groove portion of the hollow body and for shaping the remaining wall portion and a closed end portion of the hollow body by pressing the material of the hot charge in the parison mold upwardly therefrom, said presser cooperating with said partible ring to form the ring groove portion with a lesser wall thickness than the banding and the remaining wall and the closed end portions of the hollow body whereby the ring groove portion will be cooled-set before the other wall portions, and means supporting said partible ring mold and its said partible ring in a closed position for suspending the hollow body at its cooled-set ring groove portion from said partible ring during endwise-removal of said parison mold and said banding mold part from said partible ring mold.

2. Apparatus for forming heated vitreous material into a hollow packers ware tumbler body having a seamless sealing lip edge and a seamless side banding portion of full vertical extent which comprises, a unitary one-piece parison mold for forming a closed bottom wall and side walls of a hollow body having an open upper end portion, a one-piece unitary banding mold part having a continuous annular wall provided with a vertically-extending continuous offset wall portion for finish-forming a seamless lip edge and an adjacent full vertical extent of seamless banding wall portion about the open upper end portion of the hollow body, an intermediate vertically-partitioned partible ring mold cooperating in its closed position with said banding mold part and said parison mold as a mold assembly, said partible ring mold having a narrow radially-inwardly-projecting partible ring of substantially lesser vertical extent than the offset wall portion of said banding mold part said partible ring being positioned closely between opposing end portions of said banding mold part and said parison mold and projecting radially-inwardly therebeyond for finish-forming a ring groove portion about the hollow body between the seamless banding wall portion and the remaining side wall portion thereof and defining the only vertical seams of the mold assembly employed in forming the hollow body, a presser constructed to move along said banding mold part and said partible ring mold into said parison mold to form the hollow body and form the ring groove portion with a lesser thickness than the banding and the remaining side wall portions thereof whereby the ring groove portion will be cooled-set before such other portions, and said banding mold part and parison mold being endwise-removable from said partible ring mold when said partible ring is closed whereby the hollow shape may be suspended from its cooled-set ring groove portion.

References Cited in the file of this patent

UNITED STATES PATENTS

| | | |
|---|---|---|
| 1,236,606 | Sanford | Aug. 14, 1917 |
| 2,011,187 | Rowe | Aug. 13, 1935 |
| 2,012,113 | Thompson | Aug. 20, 1935 |
| 2,151,876 | Wadman | Mar. 28, 1939 |
| 2,278,572 | Slick | Apr. 7, 1942 |
| 2,310,721 | Watt | Feb. 9, 1943 |
| 2,329,057 | Kiehl | Sept. 7, 1943 |
| 2,336,821 | Wadman | Dec. 14, 1943 |
| 2,357,501 | Carnahan | Sept. 5, 1944 |
| 2,849,838 | Bartlett | Sept. 2, 1958 |